(12) United States Patent
Choi et al.

(10) Patent No.: US 12,012,035 B2
(45) Date of Patent: Jun. 18, 2024

(54) APPARATUS AND METHOD FOR COMMUNICATING DRIVING CONDITION OF VEHICLE

(71) Applicant: HYUNDAI MOBIS CO., LTD., Seoul (KR)

(72) Inventors: Ban Suk Choi, Yongin-si (KR); Seung Woo Baek, Yongin-si (KR); Hyoung Jin Choi, Yongin-si (KR); Jun Hyuk Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 20 days.

(21) Appl. No.: 17/714,346

(22) Filed: Apr. 6, 2022

(65) Prior Publication Data

US 2023/0007910 A1    Jan. 12, 2023

(30) Foreign Application Priority Data

Jul. 7, 2021 (KR) .......................... 10-2021-0089025

(51) Int. Cl.
*B60Q 1/34* (2006.01)
*B60Q 1/50* (2006.01)
*B60Q 1/52* (2006.01)

(52) U.S. Cl.
CPC ............. *B60Q 1/346* (2013.01); *B60Q 1/52* (2013.01); *B60Q 1/525* (2013.01); *B60Q 1/543* (2022.05); *B60Q 1/545* (2022.05)

(58) Field of Classification Search
CPC ............. B60W 30/06; B60W 30/045; B60W 2556/25; B60W 2556/30; B60W 30/0956; B62D 15/0285; B60R 99/00; G08G 1/16
See application file for complete search history.

(56) References Cited

U.S. PATENT DOCUMENTS

2019/0272749 A1*  9/2019  Saito .................. B60Q 9/00
2020/0238899 A1*  7/2020  Matovich ............ G01P 15/14

FOREIGN PATENT DOCUMENTS

KR       10-1908308 B1    10/2018

* cited by examiner

*Primary Examiner* — Daryl C Pope
(74) *Attorney, Agent, or Firm* — NovoTechIP International PLLC

(57) ABSTRACT

An apparatus for communicating a driving status of a vehicle may include: a surrounding environment detection unit configured to detect surrounding environment data of a vehicle; a driving status detection unit configured to detect the driving status of the vehicle; a communication lighting unit installed on the body of the vehicle; and a control unit configured to determine whether there is an object located within a designated distance around the vehicle and approaching the vehicle within a designated distance, on the basis of the surrounding environment data of the vehicle, and output information indicating the driving status of the vehicle through the communication lighting unit, when the determination result indicates that there is the corresponding object.

11 Claims, 10 Drawing Sheets

APPARATUS AND METHOD FOR COMMUNICATING DRIVING CONDITION OF VEHICLE

CROSS-REFERENCE TO RELATED APPLICATIONS

This application claims priority from and the benefit of Korean Patent Application No. 10-2021-0089025, filed on Jul. 7, 2021, which is hereby incorporated by reference for all purposes as if set forth herein.

BACKGROUND

1. Technical Field

Exemplary embodiments of the present disclosure relate to an apparatus and method for communicating a driving status of a vehicle, and more particularly, to an apparatus and method for communicating a driving status of a vehicle, which can transfer information on the driving status of a vehicle to a pedestrian or a driver of a surrounding vehicle through a vehicle body.

2. Discussion of Related Art

In general, a vehicle includes vehicle lamps having a light function for enabling a driver to easily check a target located around the vehicle during nighttime driving, and a signal function for informing other vehicles or road users of the driving status of the vehicle.

For example, the vehicle lamps directly emit light by using lamps, and include a headlight for securing a driver's view by emitting light forward, a brake light which is turned on when a brake is stepped down, a turn indicator which is used when the vehicle makes a right or left turn, and a backup light which is turned on when the vehicle goes backward. In addition, the vehicle includes reflectors which are mounted at the front and rear of the vehicle, and reflect light such that the ego vehicle can be easily recognized from the outside.

As described above, the lamps mounted at the front and rear of the vehicle function to notify the driving status of the vehicle and the driver's intention to the outside.

In the related art, however, since only the lamps mounted at the front and rear of the vehicle are used to notify the vehicle's driving status, the range of the visibility is limited, and only information limited to intention communication and condition prediction of the driver is transferred.

The related art of the present disclosure is disclosed in Korean Patent No. 1908308 registered on Oct. 10, 2018 and entitled "Vehicle Lamp".

SUMMARY

Various embodiments are directed to an apparatus and method for communicating a driving status of a vehicle, which can transfer information on a driving status of a vehicle to a pedestrian or a driver of a surrounding vehicle through a vehicle body.

Also, various embodiments are directed to an apparatus and method for communicating a driving status of a vehicle, which includes a communication lighting module configured to help a surrounding vehicle to predict the moving line of a vehicle, and can expand the communication range between vehicles.

In an embodiment, an apparatus for communicating a driving status of a vehicle may include: a surrounding environment detection unit configured to detect surrounding environment data of a vehicle; a driving status detection unit configured to detect the driving status of the vehicle; an external lighting unit installed on the body of the vehicle; and a control unit configured to determine whether there is an object located within a designated distance around the vehicle and approaching the vehicle within a designated distance, on the basis of the surrounding environment data of the vehicle, and output information indicating the driving status of the vehicle through the external lighting unit, when the determination result indicates that there is the corresponding object.

The surrounding environment detection unit may detect the surrounding environment data of the vehicle, including one or more of ambient brightness, weather information, road type, lane width, obstacle location, and distance and speed of a surrounding vehicle.

The driving status detection unit may detect one or more of driving mode switching, direction switching, going backward, U-turn, starting to go, stopping, cut-in, braking, start-up, brake operation and evasion steering of the vehicle.

The external lighting unit may be installed at one or more of the front, side, rear, top and bottom of the body of the vehicle.

The external lighting unit may be formed in a shape corresponding to the installation location thereof on the vehicle body, and formed or installed in a shape corresponding to the exterior design of the vehicle.

The external lighting unit may have a plurality of light sources which are installed in a predetermined number of orientations obtained by subdividing four directions, i.e., East, West, South and North.

The control unit may adjust the luminous intensities of the respective light sources installed in the external lighting unit in consideration of the surrounding environment data.

The control unit may output information indicating the driving status of the vehicle through the external lighting unit installed in a direction facing the detected object.

In an embodiment, a method for communicating a driving status of a vehicle may include: detecting, by a control unit, a driving status of a vehicle through a driving status detection unit; detecting, by the control unit, surrounding environment data of the vehicle through a surrounding environment detection unit; determining, by the control unit, whether there is an object located within a designated distance around the vehicle or approaching the vehicle within a designated distance, on the basis of the surrounding environment data of the vehicle; and outputting, by the control unit, information indicating the driving status of the vehicle through an external lighting unit, when there is an object located within the designated distance around the vehicle or approaching the vehicle within the designated distance.

In the detecting of the driving status of the vehicle, the control unit may detect one or more of driving mode switching, direction switching, going backward, U-turn, starting to go, stopping, cut-in, braking, start-up, brake operation and evasion steering of the vehicle.

The surrounding environment data of the vehicle may include one or more of ambient brightness, weather information, road type, lane width, obstacle location, and distance and speed of a surrounding vehicle.

In the outputting of the information through the external lighting unit, the control unit may output information indicating the driving status of the vehicle through the external lighting unit installed in a direction facing the detected object.

In the outputting of the information through the external lighting unit, the control unit may adjust the luminous intensities of light sources installed in the external lighting unit in consideration of the surrounding environment data.

In accordance with an aspect of the present disclosure, the apparatus and method for communicating a driving status of a vehicle may output information on the driving status of the vehicle 10 to a pedestrian or a driver of a surrounding vehicle through the vehicle body, thereby improving the convenience and stability of a user in the vehicle (or autonomous vehicle) and the stability of a pedestrian or a driver of an on-coming vehicle.

In accordance with another aspect of the present disclosure, the apparatus and method for communicating a driving status of a vehicle may include the external lighting unit which transfers information through the vehicle body such that a pedestrian and a surrounding vehicle can predict the moving line of the vehicle, thereby expanding the communication range between the vehicles and improving the stability with surrounding vehicles.

In accordance with an aspect of the present disclosure, the apparatus and method for communicating a driving status of a vehicle in accordance with still another aspect of the present disclosure may improve the merchantability (aesthetic effect) and visibility of the vehicle exterior through pictogram (flexibility of information transfer) lighting as a lighting configuration specified for an autonomous vehicle.

The effects of the present disclosure are not limited to the above-described effects, but may include various effects from the following contents to be described below, as long as the contents are obvious to those skilled in the art.

DETAILED DESCRIPTION

Figure 1:
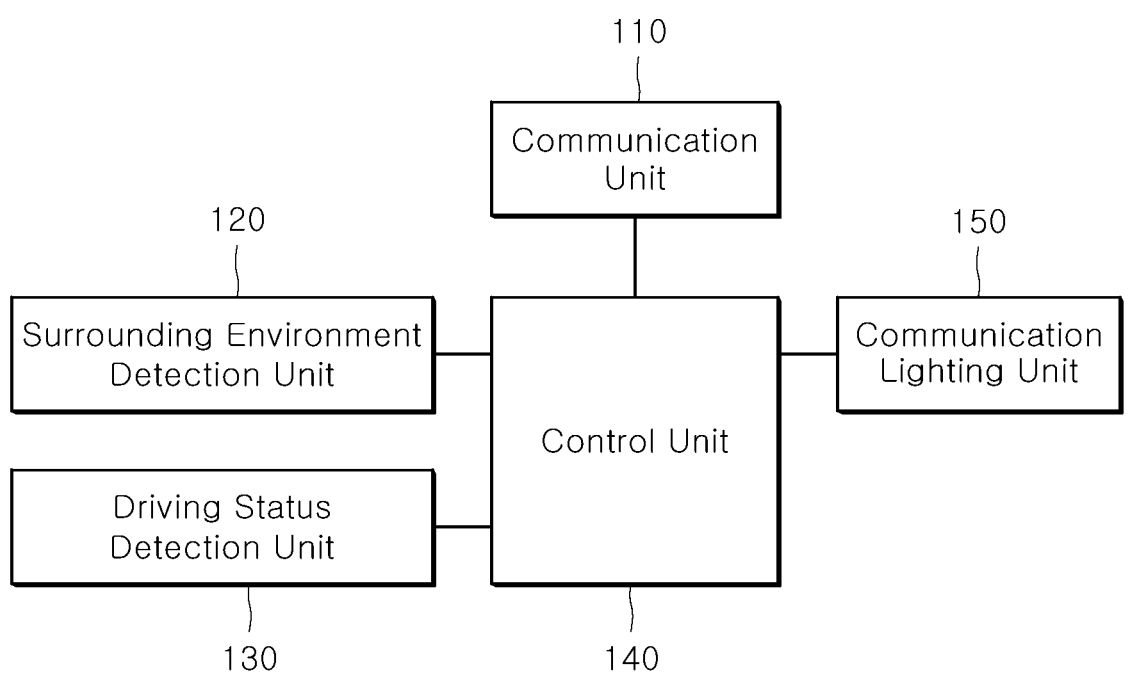
FIG. 1 is a block diagram schematically illustrating an apparatus for communicating a driving status of a vehicle in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for communicating a driving status of a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Figure 2:
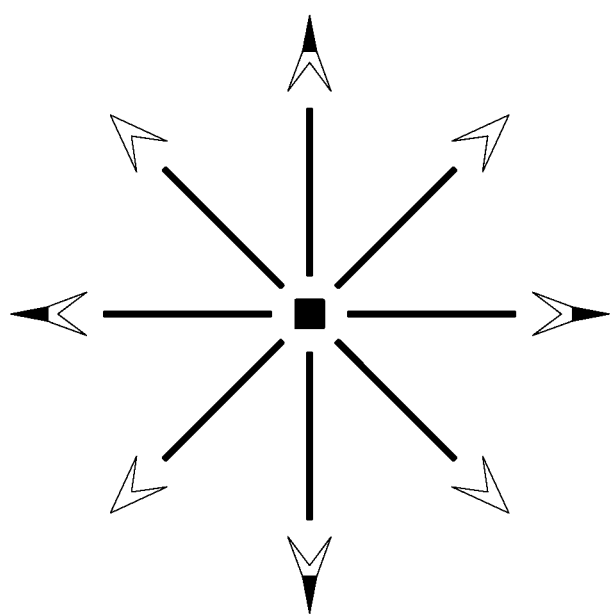
FIG. 2 is a diagram for describing an external lighting unit in accordance with the embodiment of the present disclosure.
Figure 3:
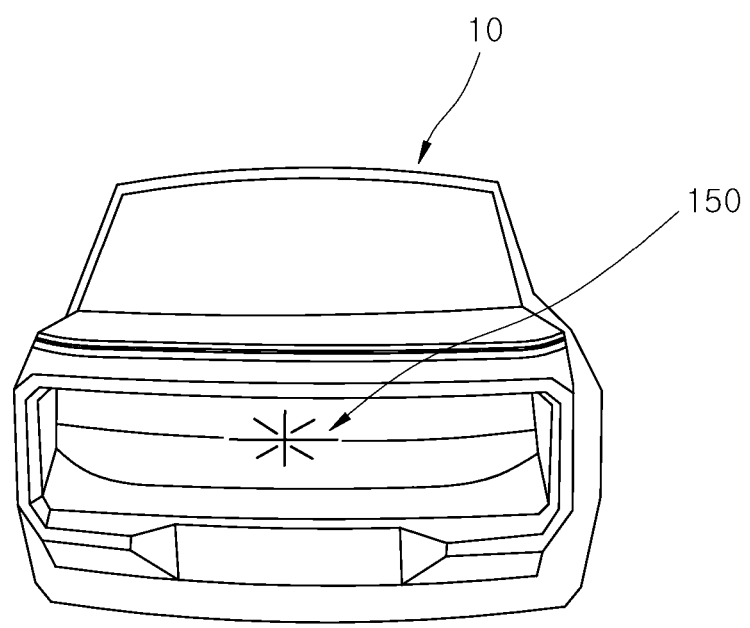
FIG. 3 is a diagram for describing an external lighting unit installed at the rear of the vehicle in accordance with the embodiment of the present disclosure.

FIG. 1 is a block diagram schematically illustrating an apparatus for communicating a driving status of a vehicle in accordance with an embodiment of the present disclosure, FIG. 2 is a diagram for describing a communication lighting unit or an external lighting unit in accordance with the embodiment of the present disclosure, FIG. 3 is a diagram for describing a communication lighting unit installed at the rear of the vehicle in accordance with the embodiment of the present disclosure, and FIGS. 4A to 4F are diagrams for describing a method for outputting information on the driving status of the vehicle through the communication lighting unit in accordance with the embodiment of the present disclosure.

Referring to FIG. 1, the apparatus for communicating a driving status of a vehicle in accordance with the embodiment of the present disclosure includes a communication unit 110, a surrounding environment detection unit 120, a driving status detection unit 130, a control unit 140 and a communication lighting unit or external lighting unit 150.

The communication unit 110 is a component for communication with a surrounding vehicle, and may transmit and receive driving status information to and from the surrounding vehicle. The driving status information of the surrounding vehicle may include state information (driving information, driving mode, speed and the like) of the surrounding vehicles and surrounding recognition information (road information and weather information and the like). Such a communication unit 110 may be a V2X (Vehicle to Everything) communication unit, for example. The V2X communication may collectively represent communication technologies through all interfaces with the vehicle 10, and include V2V (Vehicle to Vehicle), V2I (Vehicle to Infrastructure) and the like.

For example, the communication unit 110 may perform V2X communication with forward/backward vehicle at the front and rear of the vehicle 10 or a vehicle on an adjacent lane. The adjacent lane indicates a lane to which the vehicle 10 can change the driving lane, and corresponds to an either lane abutting on the driving lane of the vehicle 10. In particular, the communication unit 110 may receive state information of the surrounding vehicle and provide the received state information to the control unit 140.

The surrounding environment detection unit 120 may detect the surrounding environment of the vehicle 10 and generate surrounding environment data. That is, the surrounding environment detection unit 120 may detect the surrounding environment of the vehicle 10 and generate surrounding environment data or information including, for example, surrounding object information, surrounding traffic information and weather information, etc. The object may include a vehicle, a road facility, a pedestrian and the like, the surrounding object information may include the speed and distance of a surrounding vehicle (forward vehicle/backward vehicle), the surrounding traffic information may include frequent accident zone information and the like, and the weather information may include rain, illuminance, temperature and the like.

The driving environment detection unit is not particularly limited in kind as long as the driving environment detection unit can sense the surrounding environment data of the vehicle 10. Examples of the driving environment detection unit may include a camera, ultrasonic sensor, lidar sensor, radar sensor, weather sensor, light sensor, illuminometer and the like.

The surrounding environment detection unit 120 may communicate (e.g., V2P or V2V) with a traffic infrastructure facility, another vehicle and a user's mobile phone around the vehicle through the communication unit 110, and detect the surrounding environment data of the vehicle 10 by additionally using information received from the traffic infrastructure facility, another vehicle or the user's mobile phone.

The driving status detection unit 130 may detect a driving status of the vehicle 10. That is, the driving status detection unit 130 may detect driving mode switching, direction switching, going backward, U-turn, starting to go, stopping, cut-in, braking, start-up, braking and evasion steering of the vehicle 10.

At this time, the driving status of the vehicle 10 may include driving mode switching, direction switching, going backward, braking and the like. The driving mode switching may indicate switching from a normal driving mode to an autonomous driving mode or from the autonomous driving mode to the normal driving mode, and the direction switching may indicate moving to the right or left.

Such a driving status detection unit 130 may detect the going backward of the vehicle 10 through switch-on of a backup light, detect the direction switching of the vehicle 10 through switch-on of a turn indicator, detect the braking of the vehicle 10 through switch-on of a brake light, and detect the mode switching of the vehicle 10 to the autonomous driving mode through an autonomous driving controller. The driving status detection unit 130 may detect the forward/backward movement of the vehicle 10 through a transmission or the like, and detect the direction switching of the vehicle 10 through the rotation angle of a wheel or steering wheel, a driver's manipulation, lane detection or the like. The driving status detection unit 130 is not particularly limited in kind as long as the driving status detection unit can detect the driving status of the vehicle 10. Examples of the driving status detection unit 130 may include a camera, ultrasonic sensor, lidar sensor, radar sensor, IMU sensor and location sensor (GPS module).

The control unit 140 may determine whether there is an object which is located within a designated distance around the vehicle 10 or approaches the vehicle 10 within a designated distance, on the basis of the surrounding environment data of the vehicle 10. When the determination result indicates that the corresponding object is present, the control unit 140 may output, through the communication lighting unit 150, information indicating the driving status of the vehicle 10.

That is, the control unit 140 may determine whether an object (e.g., pedestrian, on-coming vehicle, two-wheeled vehicle or the like) is around the vehicle 10 or approaches the vehicle 10. When an object is around the vehicle 10 and approaches the vehicle 10, the control unit 140 may output information indicating the driving status of the vehicle 10, detected by the driving status detection unit 130, through the communication lighting unit 150. At this time, the control unit 140 may output information indicating the driving status of the vehicle 10 through the communication lighting unit 150 installed in a direction facing the detected object.

The information outputted through the communication lighting unit 150 by the control unit 140 may serve to help the object (e.g., pedestrian, on-coming vehicle or two-wheeled vehicle) to recognize the current condition and future condition (e.g., driving direction switching, stopping or starting to go) of the vehicle 10. Therefore, the control unit 140 may output information in the direction that the object (e.g., pedestrian, on-coming vehicle or two-wheeled vehicle) can see the information, or the direction facing the object. The control unit 140 may output information onto the front of the vehicle body if the object is located at the front of the vehicle, output information onto the right side of the vehicle body if the object is located on the right of the vehicle, or output information onto the rear of the vehicle body if the object is located at the rear of the vehicle.

Furthermore, the control unit 140 may adjust the luminous intensity of each light source installed in the communication lighting unit 150 in consideration of the surrounding environment data generated by the surrounding environment detection unit 120. At this time, the luminous intensity of the light source may be adjusted by controlling a current value. For example, the control unit 140 may adjust the luminous intensity of the communication lighting unit 150 in consideration of ambient illuminance. At this time, when the ambient illuminance is lower than reference illuminance, the control unit 140 may adjust the luminous intensity of the light source installed in the communication lighting unit 150 to a lower value than a reference luminous intensity. At this time, when the ambient illuminance is higher than the reference illuminance, the control unit 140 may adjust the luminous intensity of the light source installed in the communication lighting unit 150 to a higher value than the reference luminous intensity.

Furthermore, the control unit 140 may adjust the luminous intensity of the communication lighting unit 150 in consideration of weather information.

The communication lighting unit 150 may be installed on the body of the vehicle 10, and output information indicating the driving status of the vehicle 10. The body of the vehicle 10 may include the front, sides, rear, top, and bottom thereof.

The communication lighting unit 150 may include a plurality of light sources capable of indicating the direction, and a light emitting diode may be used as each of the light sources. However, the present disclosure is not limited thereto. For example, the communication lighting unit 150 may be composed of one or more LEDs and switched on/off while emitting light in a specific color such as blue, green, yellow or red according to the function of lighting. The LEDs may be individually operated and progressively switched on to output information on the driving status of the vehicle 10. Furthermore, the communication lighting unit 150 may perform an information output function as a display panel while performing the function of a lighting lamp by using the LEDs. For example, the communication lighting unit 150 may output a text, image, pictogram, graphic, number and the like.

For example, the communication lighting unit 150 may have a shape illustrated in FIG. 2. Referring to FIG. 2, the communication lighting unit 150 may have light sources installed in a plurality of radial directions, which may be obtained by subdividing four directions, i.e., East, West, South and North.

Referring to FIG. 3, the communication lighting unit 150 having the shape of FIG. 2 may be installed at the rear of the vehicle body, for example.

The communication lighting unit 150 may be installed (or formed) in the same or different shape depending on the installation position thereof on the vehicle body, e.g., the front, side or rear of the vehicle body. That is, the communication lighting unit 150 may be installed (or formed) in a shape corresponding to the exterior design (body design) of the vehicle 10.

The communication lighting unit 150 may include a plurality of light sources which output information on the driving status of the vehicle 10 while switched on/off under condition of the control unit 140. At this time, the plurality of light sources of the communication lighting unit 150 may individually operate to emit light in a progressive manner. That is, the respective light sources of the communication lighting unit 150 may be progressively switched on/off. At this time, the duration in which the light sources are switched on, the duration in which the light sources are switched off, and the time interval between the duration in which the light sources are switched on and the duration in which the light sources are switched off may be randomly set in advance.

The communication lighting unit 150 may display information related to the driving status or the like of the vehicle 10 through various combinations of light patterns and colors.

For example, the communication lighting unit 150 may display various conditions in different manners, the various conditions including the condition in which the vehicle is stopped in the autonomous driving mode, the condition in which the vehicle is being switched to the autonomous driving mode, and the condition in which the vehicle is driving in the autonomous driving mode. The communication lighting unit 150 may display information, characters and symbols, which are related to the diving of the vehicle 10, in all directions of the vehicle 10.

The vehicle 10 includes existing vehicle lamps such as a brake light, backup light and turn indicator, in addition to the communication lighting unit 150. Thus, the communication lighting unit 150 installed on the vehicle body may operate at the same time as the functions of the existing vehicle lamps.

That is, the communication lighting unit 150 may output information indicating the driving status of the vehicle 10 with the brake light, the backup light, the turn indicator and the like which are installed in the vehicle 10. Thus, a surrounding vehicle approaching the vehicle 10 from the rear left or right as well as the rear of the vehicle 10 may also easily check the driving status of the vehicle 10 through the communication lighting unit 150, and prepare for the driving status.

For example, when the vehicle 10 is being stopped, the brake light and the communication lighting unit 150 may inform a surrounding vehicle approaching the vehicle 10 that the vehicle 10 is being stopped. When the vehicle 10 goes backward, the backup light and the communication lighting unit 150 may inform a surrounding vehicle approaching the vehicle 10 that the vehicle 10 is going backward. When the vehicle 10 is switching the direction, the turn indicator and the communication lighting unit 150 may inform a surrounding vehicle approaching the vehicle 10 that the vehicle 10 is switching the direction. Thus, a driver of the surrounding vehicle can prepare for the braking, going backward and direction switching of the vehicle 10.

Figure 4A:
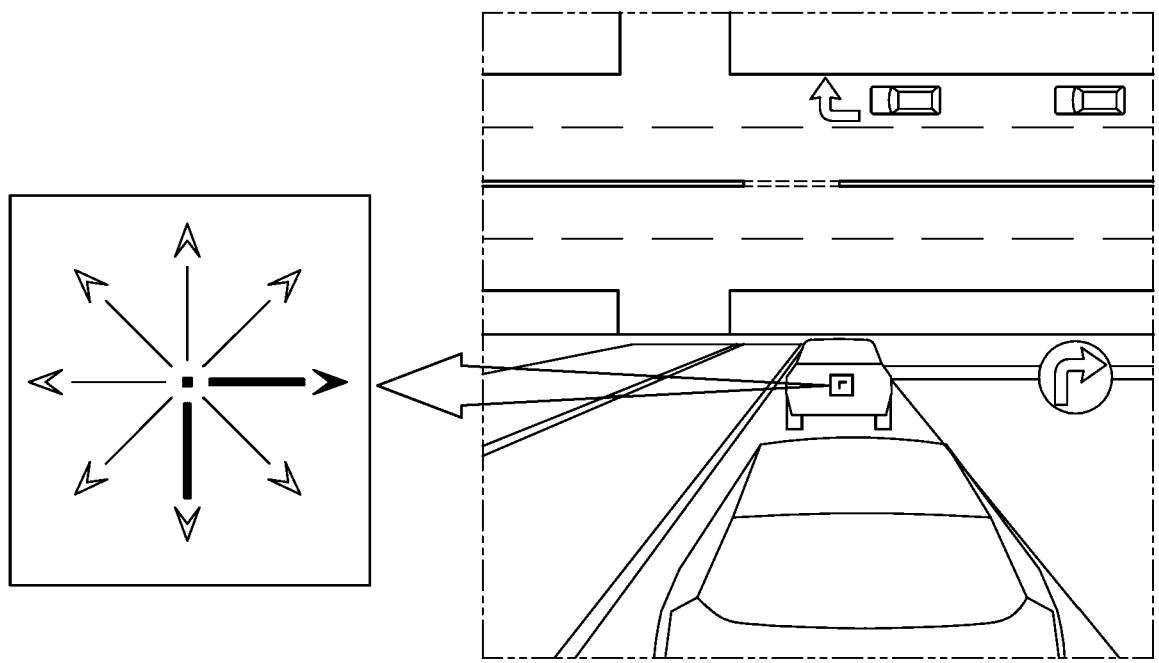
FIGS. 4A to 4F are diagrams for describing a method for outputting information on the driving status of the vehicle through the external lighting unit in accordance with the embodiment of the present disclosure.
Figure 4B:
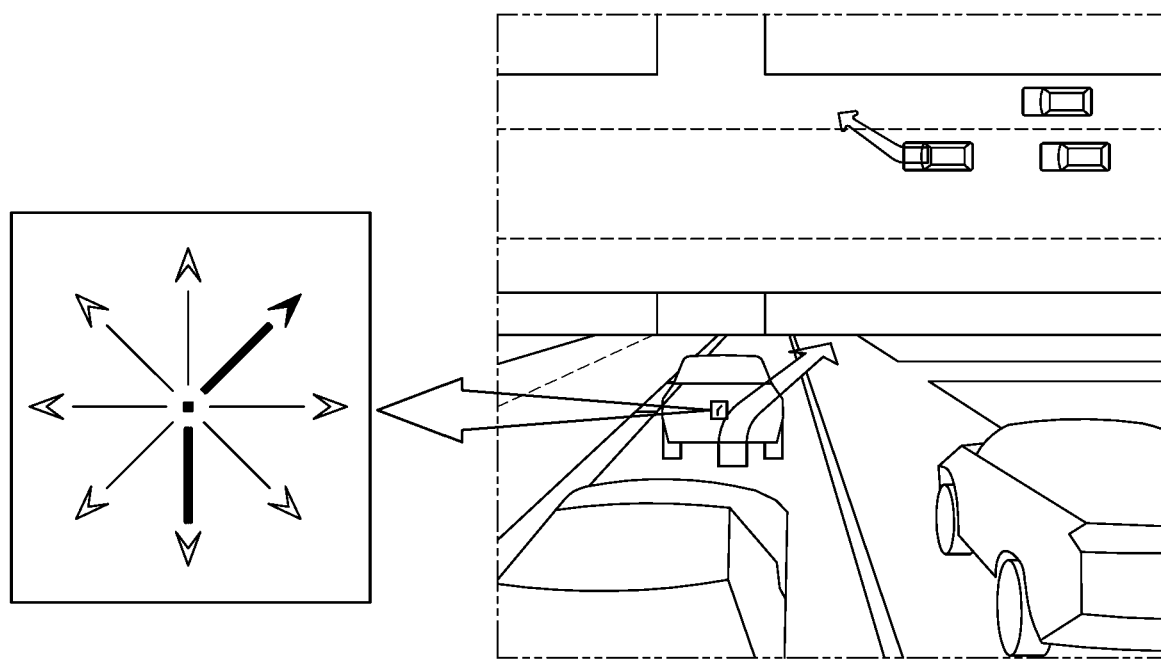
Figure 4C:
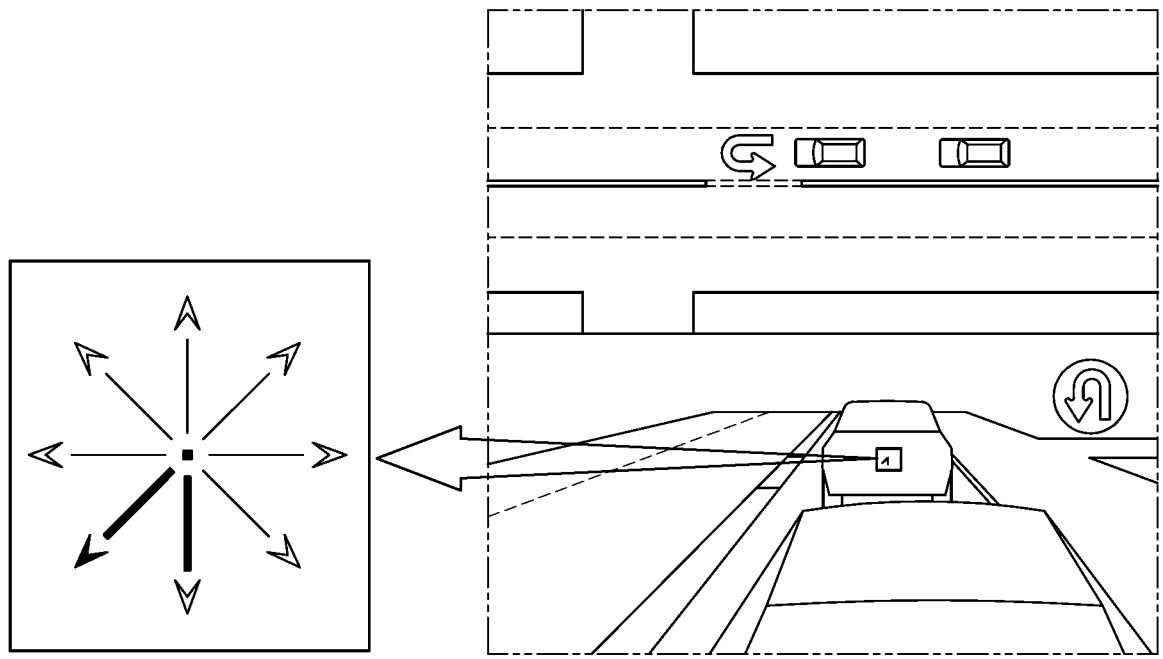
Figure 4D:
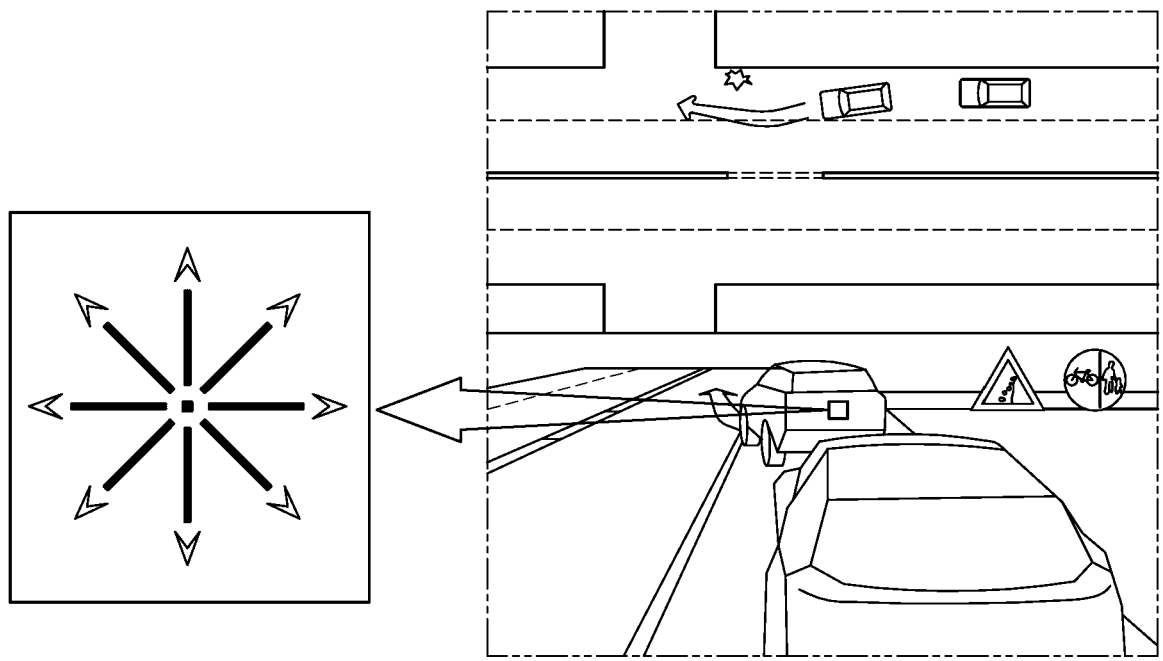
Figure 4E:
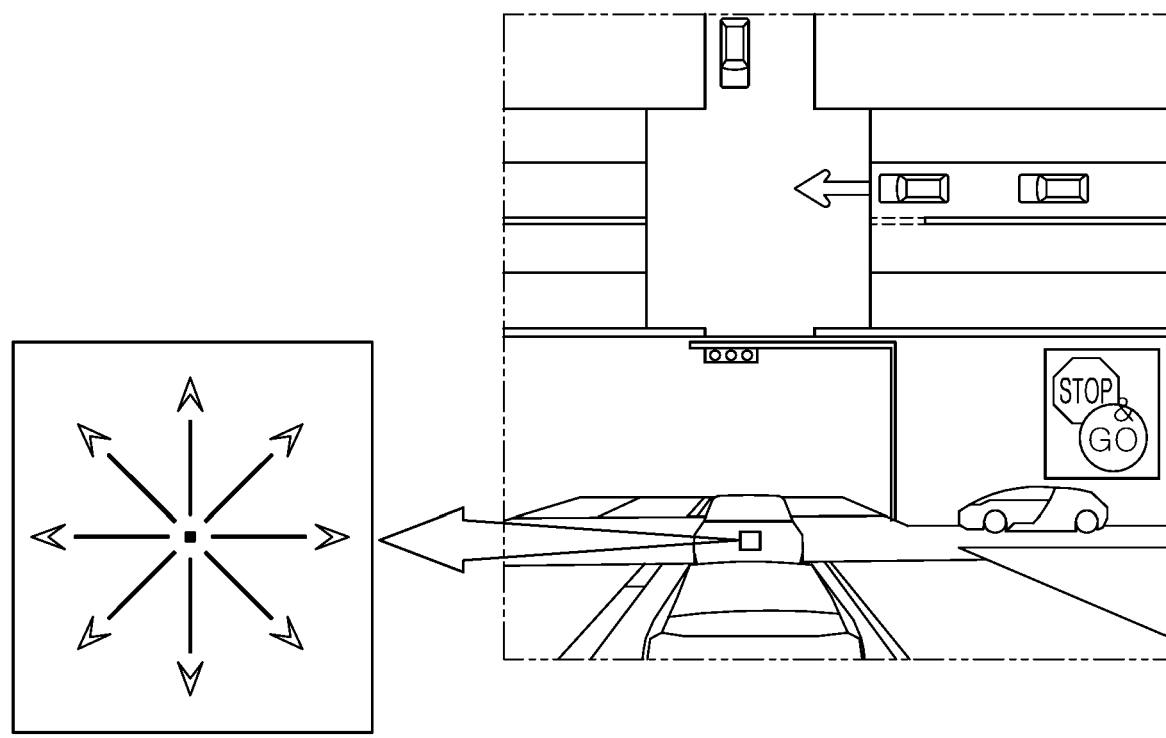
Figure 4F:
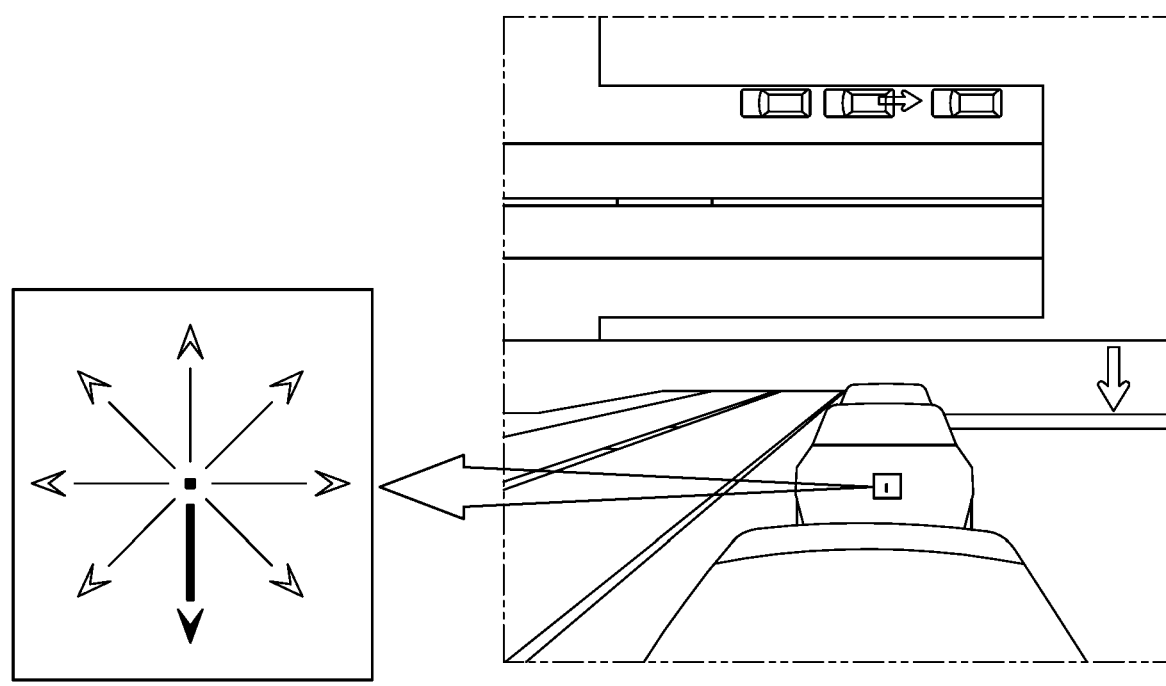

A method for transferring information indicating the driving status of the vehicle 10 to a target (e.g., a pedestrian or a driver of another vehicle) at the rear of the vehicle 10 through the communication lighting unit 150 installed at the rear of the vehicle body will be described with reference to FIG. 4. When the vehicle 10 is intended to turn to the left, the control unit 140 may control the communication lighting unit 150 to output information indicating the turn to the left, as illustrated in FIG. 4A. When the vehicle 10 is intended to cut in the lane, the control unit 140 may control the communication lighting unit 150 to output information indicating the cut-in, as illustrated in FIG. 4B. When the vehicle 10 is intended to make a U-turn, the control unit 140 may control the communication lighting unit 150 to output information indicating the U-turn, as illustrated in FIG. 4C. When the vehicle 10 is intended to perform evasion steering, the control unit 140 may control the communication lighting unit 150 to output information indicating the evasion steering, as illustrated in FIG. 4D. When the vehicle 10 prepares to go, the control unit 140 may control the communication lighting unit 150 to output information indicating the preparing to go, as illustrated in FIG. 4E. When the vehicle 10 is intended to go backward, the control unit 140 may control the communication lighting unit 150 to output information indicating the going backward, as illustrated in FIG. 4F.

As described above, the information on the driving status of the vehicle 10 may be displayed through the communication lighting unit 150, which makes it possible to improve a user's convenience and stability.

The apparatus for communicating the driving status of the vehicle 10 in accordance with the embodiment of the present disclosure may further include a display unit (not illustrated) and a map storage unit (not illustrated) for storing a digital map including the current location and route of the vehicle 10 and the road and traffic facilities. In this case, the control unit 140 may search for the current state and route of the vehicle 10 by using the map of the map storage unit and a location sensed by a location sensor (not illustrated). The control unit 140 may output the driving status of the vehicle 10 through the display unit by using the surrounding environment data detected through the surrounding environment detection unit 120 and the current state and route of the vehicle 10.

Figure 5:
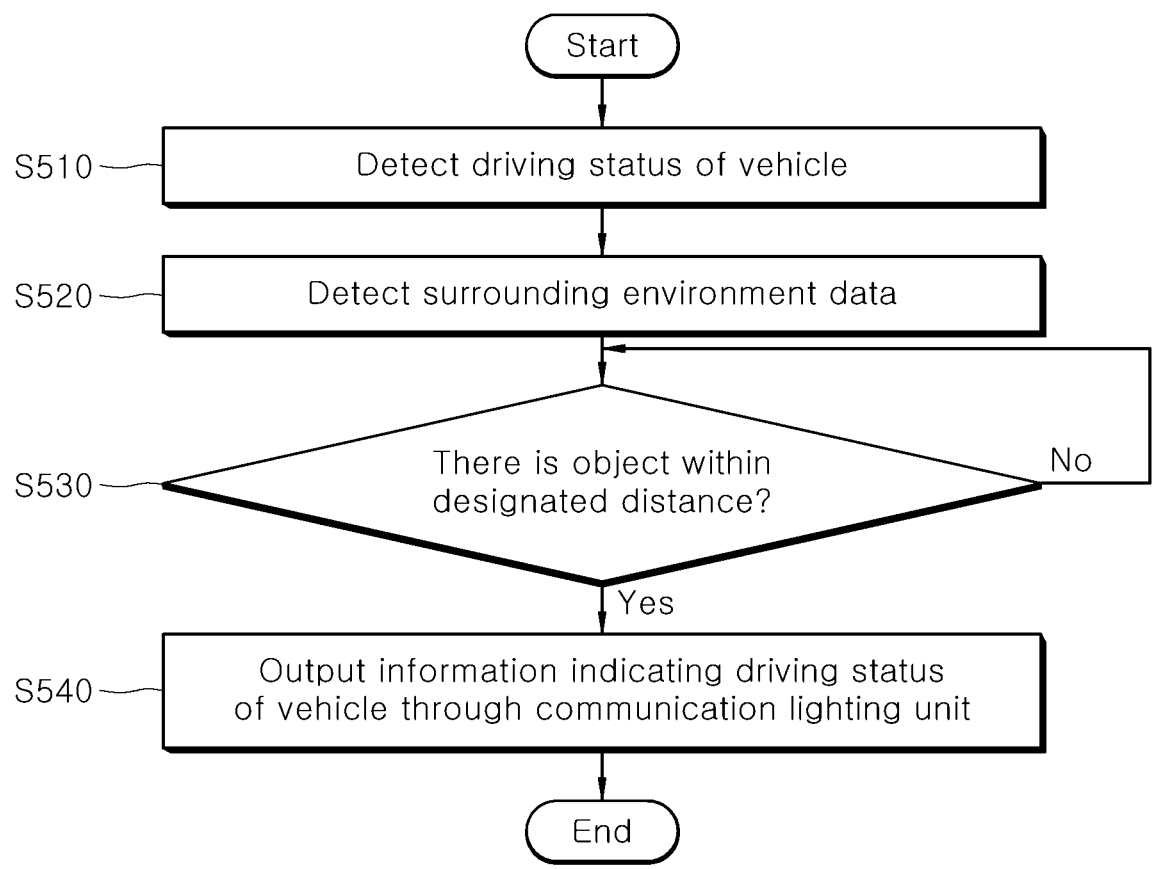
FIG. 5 is a flowchart for describing a method for communicating a driving status of a vehicle in accordance with an embodiment of the present disclosure.

FIG. 5 is a flowchart for describing a method for communicating a driving status of a vehicle in accordance with an embodiment of the present disclosure.

Referring to FIG. 5, the control unit 140 detects the driving status of the vehicle 10 through the driving status detection unit 130 in step S510. At this time, the control unit 140 may detect one or more of driving mode switching, direction switching, going backward, U-turn, starting to go, stopping, cut-in, braking, start-up, brake operation and evasion steering of the vehicle 10.

When step S510 is performed, the control unit 140 detects the surrounding environment data of the vehicle 10 through the surrounding environment detection unit 120 in step S520, and determines whether there is an object located within a designated distance around the vehicle 10 or approaching the vehicle 10 within a designated distance, on the basis of the surrounding environment data of the vehicle 10, in step S530.

When the determination result of step S530 indicates that there is an object located within the designated distance around the vehicle 10 or approaching the vehicle 10 within the designated distance, the control unit 140 outputs information, indicating the driving status of the vehicle 10, to the communication lighting unit 150 in step S540.

For example, when the vehicle 10 is intended to turn to the left, the control unit 140 may control the communication lighting unit 150 to output information indicating the turn to the left, as illustrated in FIG. 4A. When the vehicle 10 is intended to cut in the lane, the control unit 140 may control the communication lighting unit 150 to output information indicating the cut-in, as illustrated in FIG. 4B. When the vehicle 10 is intended to make a U-turn, the control unit 140 may control the communication lighting unit 150 to output information indicating the U-turn, as illustrated in FIG. 4C. When the vehicle 10 is intended to perform evasion steering, the control unit 140 may control the communication lighting unit 150 to output information indicating the evasion steering, as illustrated in FIG. 4D. When the vehicle 10 prepares to go, the control unit 140 may control the communication lighting unit 150 to output information indicating the preparing to go, as illustrated in FIG. 4E. When the vehicle 10 is intended to go backward, the control unit 140 may control the communication lighting unit 150 to output information indicating the going backward, as illustrated in FIG. 4F.

As such, the apparatus and method for communicating a driving status of a vehicle in accordance with one aspect of the present disclosure may output information on the driving status of the vehicle 10 to a pedestrian or a driver of a surrounding vehicle through the vehicle body, thereby improving the convenience and stability of a user in the vehicle (or autonomous vehicle) and the stability of a pedestrian or a driver of an on-coming vehicle.

The apparatus and method for communicating a driving status of a vehicle in accordance with another aspect of the present disclosure may include the communication lighting unit 150 which transfers information through the vehicle body such that a pedestrian and a surrounding vehicle can predict the moving line of the vehicle 10, thereby expanding the communication range between the vehicles and improving the stability with surrounding vehicles.

The apparatus and method for communicating a driving status of a vehicle in accordance with still another aspect of the present disclosure may improve the merchantability (aesthetic effect) and visibility of the vehicle exterior through pictogram (flexibility of information transfer) lighting as a lighting configuration specified for an autonomous vehicle.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for externally indicating a driving status of a vehicle, comprising:
   a surrounding environment detection unit configured to detect a surrounding environment of a vehicle and generate surrounding environment data indicating the detected surrounding environment of the vehicle;
   a driving status detection unit configured to detect a driving status of the vehicle;
   an external lighting unit disposed at the vehicle and configured to externally output a visual image representing the driving status of the vehicle; and
   a control unit configured to:
      determine, based on the surrounding environment data, whether there is an object within a predetermined distance from the vehicle; and
      in response to determining that there is an object within the predetermined distance from the vehicle, controlling the external lighting unit to output the visual image representing the driving status of the vehicle,
   wherein the external lighting unit includes a plurality of lighting devices respectively extending longitudinally in a plurality of radial directions, and
   wherein the controller is configured to individually control the plurality of light devices to respectively generate different parts of the visual image.

2. The apparatus of claim 1, wherein the surrounding environment of the vehicle includes at least one of ambient brightness, weather, a road type, a lane width, an obstacle location, and a distance or speed of a nearby vehicle.

3. The apparatus of claim 1, wherein the driving status of the vehicle includes at least one of switching a driving mode, changing a driving direction, driving in reverse, making a U-turn, starting to move, stopping, cutting in, braking, starting up, performing a braking operation and evasive steering.

4. The apparatus of claim 1, wherein the external lighting unit is positioned at least one of a front, side, rear, top and bottom of the vehicle.

5. The apparatus of claim 1, wherein the external lighting unit has a shape corresponding to an installation structure on the vehicle and an exterior design of the vehicle.

6. The apparatus of claim 1, wherein the control unit is configured to adjust luminous intensities of the plurality of lighting devices based on the surrounding environment data.

7. The apparatus of claim 1, wherein the external lighting unit is disposed at a portion of the vehicle facing the object.

8. A method for externally indicating a driving status of a vehicle, comprising:
   detecting a driving status of a vehicle;
   detecting surrounding environment of the vehicle and generating surrounding environment data indicating the detected surrounding environment;
   determining, based on the surrounding environment data, whether there is an object within a predetermined distance from the vehicle; and in response to determining that there is an object within the predetermined distance from the vehicle, controlling an external lighting unit to externally output a visual image representing the driving status of the vehicle, wherein the external lighting unit comprises a plurality of lighting devices respectively extending longitudinally in a plurality of radial directions, and wherein controlling the external light unit comprises individually controlling the plurality of light devices to respectively generate different parts of the visual image.

9. The method of claim 8, wherein the driving status of the vehicle includes at least one of switching a driving mode, changing a driving direction, driving in reverse, making a U-turn, starting to move, stopping, cutting in, braking, starting up, performing a brake operation, and evasive steering.

10. The method of claim 8, wherein the surrounding environment of the vehicle includes at least one of ambient brightness, weather, a road type, a lane width, an obstacle location, and a distance or speed of a nearby vehicle.

11. The method of claim 8, wherein controlling the external lighting unit comprises adjusting luminous intensities of the plurality of lighting devices based on the surrounding environment data.

* * * * *